(12) United States Patent
Sun et al.

(10) Patent No.: US 7,673,241 B2
(45) Date of Patent: Mar. 2, 2010

(54) USER INTERFACE FOR MULTI-MEDIA COMMUNICATION FOR THE VISUALLY DISABLED

(75) Inventors: Zhaoyang Sun, Santa Clara, CA (US); Mingte Chen, Fremont, CA (US); Shashidhar Gundu Rao, Palo Alto, CA (US); Anil Kumar Annadata, Milpitas, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1156 days.

(21) Appl. No.: 10/180,674

(22) Filed: Jun. 26, 2002

(65) Prior Publication Data

US 2007/0198945 A1    Aug. 23, 2007

(51) Int. Cl.
*G06F 3/00* (2006.01)
(52) U.S. Cl. .................. 715/729; 715/727; 715/810; 715/821; 715/835; 715/865; 715/978
(58) Field of Classification Search .............. 715/729, 715/865
See application file for complete search history.

(56) References Cited

U.S. PATENT DOCUMENTS

| | | | | |
|---|---|---|---|---|
| 5,287,102 A * | 2/1994 | McKiel, Jr. | ............ | 340/825.19 |
| 5,473,680 A | 12/1995 | Porter | .................... | 379/221.15 |
| 5,506,898 A | 4/1996 | Costantini et al. | ........... | 379/266 |
| 5,524,147 A | 6/1996 | Bean | .......................... | 379/265 |
| 5,555,365 A | 9/1996 | Selby et al. | .................. | 395/159 |
| 5,594,791 A | 1/1997 | Szlam et al. | ................ | 379/265 |
| 5,699,361 A | 12/1997 | Ding et al. | ................... | 370/431 |
| 5,715,412 A * | 2/1998 | Aritsuka et al. | ............. | 715/729 |
| 5,734,852 A | 3/1998 | Zias et al. | ................... | 715/744 |
| 5,754,830 A | 5/1998 | Butts et al. | .................. | 719/311 |
| 5,805,886 A | 9/1998 | Skarbo et al. | ............... | 719/318 |

(Continued)

FOREIGN PATENT DOCUMENTS

EP    1113656 A2    7/2001

(Continued)

OTHER PUBLICATIONS

Microsoft Corporation, "Microsoft Internet Explorer 5 Resource Kit", Jan. 19, 2000, Microsoft Press, pp. 1-7.*

(Continued)

*Primary Examiner*—Tadesse Hailu
*Assistant Examiner*—Alvin H Tan
(74) *Attorney, Agent, or Firm*—Cambell Stephenson LLP

(57) ABSTRACT

A method, user interface module, computer program product, computer system and system that enable a graphical user interface to be used by persons with visual disabilities. The graphical user interface includes a toolbar, which provides features that enable a visually disabled user to navigate and activate the functions provided by buttons or other controls on the communication toolbar. As a user navigates around the user interface, auditory messages are read describing functionality of different features of the graphical user interface. The text can be audibly read by, for example, a screen reader module. By using a hotkey or menu navigation, a user can issue commands that would normally be issued by clicking on the toolbar. Furthermore, the user can type text into text input boxes, select items from combo boxes, enable broadcast messages to be read, and choose to listen to status messages.

38 Claims, 5 Drawing Sheets

U.S. PATENT DOCUMENTS

| | | | |
|---|---|---|---|
| 5,828,882 A | 10/1998 | Hinckley | 719/318 |
| 5,852,732 A | 12/1998 | Freund et al. | 718/101 |
| 5,884,032 A | 3/1999 | Bateman et al. | 395/200.34 |
| 5,894,512 A | 4/1999 | Zenner | 379/265 |
| 5,905,879 A | 5/1999 | Lambrecht | 395/297 |
| 5,915,011 A | 6/1999 | Miloslavsky | 379/219 |
| 5,928,325 A | 7/1999 | Shaughnessy et al. | 709/206 |
| 5,946,399 A | 8/1999 | Kitaj et al. | 380/49 |
| 5,961,620 A | 10/1999 | Trent et al. | 710/105 |
| 5,964,836 A | 10/1999 | Rowe et al. | 709/221 |
| 5,983,019 A | 11/1999 | Davidson | 395/705 |
| 5,983,184 A * | 11/1999 | Noguchi | 704/270 |
| 6,058,435 A | 5/2000 | Sassin et al. | 709/305 |
| 6,064,730 A | 5/2000 | Ginsberg | 379/265 |
| 6,092,102 A | 7/2000 | Wagner | 709/206 |
| 6,108,695 A | 8/2000 | Chawla | 709/217 |
| 6,111,562 A * | 8/2000 | Downs et al. | 715/862 |
| 6,134,318 A | 10/2000 | O'Neil | 379/266.01 |
| 6,138,158 A | 10/2000 | Boyle et al. | 709/225 |
| 6,154,209 A | 11/2000 | Naughton et al. | 715/764 |
| 6,175,564 B1 | 1/2001 | Miloslavsky et al. | 370/352 |
| 6,185,288 B1 | 2/2001 | Wong | 709/206 |
| 6,199,104 B1 | 3/2001 | Delph | 709/208 |
| 6,243,452 B1 | 6/2001 | O'Shaughnessey et al. | 379/201 |
| 6,263,066 B1 | 7/2001 | Shtivelman et al. | 379/266 |
| 6,300,947 B1 | 10/2001 | Kanevsky | 345/333 |
| 6,314,178 B1 | 11/2001 | Walker et al. | 379/266.01 |
| 6,314,451 B1 | 11/2001 | Landsman et al. | 709/203 |
| 6,332,154 B2 | 12/2001 | Beck et al. | 709/204 |
| 6,337,858 B1 | 1/2002 | Petty et al. | 370/356 |
| 6,389,132 B1 | 5/2002 | Price | 379/265.01 |
| 6,449,260 B1 | 9/2002 | Sassin et al. | 370/270 |
| 6,449,646 B1 | 9/2002 | Sikora et al. | 709/226 |
| 6,463,292 B1 | 10/2002 | Rahman | 455/466 |
| 6,480,600 B1 | 11/2002 | Neyman et al. | 379/265.09 |
| 6,486,892 B1 * | 11/2002 | Stern | 715/760 |
| 6,489,951 B1 * | 12/2002 | Wong et al. | 345/173 |
| 6,493,695 B1 | 12/2002 | Pickering et al. | 706/47 |
| 6,493,760 B1 | 12/2002 | Pendlebury et al. | 709/229 |
| 6,507,868 B2 | 1/2003 | Simmon et al. | 709/219 |
| 6,587,556 B1 | 7/2003 | Judkins et al. | 379/219 |
| 6,594,675 B1 | 7/2003 | Schneider | 707/200 |
| 6,625,274 B1 | 9/2003 | Hoffpauir et al. | 379/229 |
| 6,681,010 B1 | 1/2004 | Anderson et al. | 379/265.11 |
| 6,690,788 B1 | 2/2004 | Bauer et al. | 379/242 |
| 6,691,162 B1 | 2/2004 | Wick | 709/224 |
| 6,694,352 B1 | 2/2004 | Omoigui | 709/205 |
| 6,704,409 B1 | 3/2004 | Dilip et al. | 379/265.02 |
| 6,718,370 B1 | 4/2004 | Coffman et al. | 709/212 |
| 6,718,393 B1 | 4/2004 | Aditya | 709/239 |
| 6,731,609 B1 | 5/2004 | Hirni et al. | 370/260 |
| 6,744,878 B1 | 6/2004 | Komissarchik et al. | 379/265.03 |
| 6,763,369 B1 | 7/2004 | Ytuarte et al. | 709/201 |
| 6,763,384 B1 | 7/2004 | Gupta et al. | 709/224 |
| 6,771,760 B1 | 8/2004 | Vortman et al. | 379/209.01 |
| 6,771,765 B1 | 8/2004 | Crowther et al. | 379/265.09 |
| 6,816,500 B1 | 11/2004 | Mannette et al. | 370/431 |
| 6,816,880 B1 | 11/2004 | Strandberg et al. | 709/202 |
| 6,823,384 B1 | 11/2004 | Wilson et al. | 709/225 |
| 6,832,203 B1 | 12/2004 | Villena et al. | 705/8 |
| 6,879,586 B2 | 4/2005 | Miloslavsky et al. | 370/356 |
| 6,889,337 B1 * | 5/2005 | Yee | 714/1 |
| 6,895,558 B1 * | 5/2005 | Loveland | 715/746 |
| 6,944,272 B1 | 9/2005 | Thomas | 379/88.13 |
| 6,963,783 B1 | 11/2005 | Bi et al. | 700/94 |
| 6,978,311 B1 | 12/2005 | Netzer et al. | 709/232 |
| 7,092,509 B1 | 8/2006 | Mears et al. | 379/266.01 |
| 7,093,199 B2 * | 8/2006 | Cragun et al. | 715/763 |
| 7,120,675 B1 | 10/2006 | Shupak | 709/217 |
| 7,263,547 B2 | 8/2007 | Kloba et al. | 709/217 |
| 7,392,540 B1 | 6/2008 | Pell | 726/12 |
| 2001/0039596 A1 | 11/2001 | Collin et al. | |
| 2002/0026335 A1 | 2/2002 | Honda | 705/4 |
| 2002/0032809 A1 | 3/2002 | Bateman et al. | 710/5 |
| 2002/0042845 A1 | 4/2002 | Burmann et al. | 709/249 |
| 2002/0055967 A1 | 5/2002 | Coussement | 709/202 |
| 2002/0072921 A1 | 6/2002 | Boland et al. | 705/1 |
| 2002/0087385 A1 | 7/2002 | Vincent | 705/10 |
| 2002/0122053 A1 * | 9/2002 | Dutta et al. | 345/729 |
| 2002/0144233 A1 | 10/2002 | Chong et al. | 717/105 |
| 2002/0191029 A1 * | 12/2002 | Gillespie et al. | 345/810 |
| 2003/0009520 A1 | 1/2003 | Nourbakhsh et al. | 709/204 |
| 2003/0014598 A1 | 1/2003 | Brown | 711/141 |
| 2003/0018702 A1 | 1/2003 | Broughton et al. | 709/202 |
| 2003/0093533 A1 | 5/2003 | Ezerzer et al. | 709/227 |
| 2003/0164848 A1 * | 9/2003 | Dutta et al. | 345/729 |
| 2004/0031030 A1 | 2/2004 | Kidder et al. | 717/172 |
| 2005/0003812 A1 | 1/2005 | Gladwin et al. | 455/426.1 |
| 2005/0010526 A1 | 1/2005 | Takahashi et al. | 705/44 |

FOREIGN PATENT DOCUMENTS

| | | |
|---|---|---|
| WO | WO 97/16014 | 5/1997 |
| WO | WO 97/42728 | 11/1997 |
| WO | WO 00/49778 | 8/2000 |

OTHER PUBLICATIONS

GW Micro, Inc., "Window-Eyes 4.0 User's Guide", Mar. 3, 2001, pp. 1-286, Available http://web.archive.org/web/20010303133328/http://www.gwmicro.com/wemanual/.*

Schmidt, et al., Experiences with an Object-Oriented Architecture for Developing Dynamically Extensible Distributed System Management Software, Nov. 28-Dec. 2, 1994, pp. 500-506.

International Search Report as mailed from the PCT on Feb. 28, 2003 for co-related WO Application (PCT/US02/31152; Filed Sep. 30, 2002), 5 pages.

International Search Report as mailed from the PCT on Jul. 12, 2002, for International Application No. PCT/US02/09879, 4 pages.

International Search Report as mailed from the PCT on Sep. 4, 2002, for International Application No. PCT/US02/10191, 4 pages.

* cited by examiner

USER INTERFACE FOR MULTI-MEDIA COMMUNICATION FOR THE VISUALLY DISABLED

CROSS-REFERENCE TO RELATED APPLICATIONS

This application is related to application Ser. No. 09/823,531 filed on Mar. 31, 2001, entitled "User Interface for Multi-Channel Communication" and naming Mingte Chen, Anil K. Annadata, and Kuang Huang as inventors, the application being incorporated herein by reference in its entirety.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Section 508 of the amended Rehabilitation Act of 1998 extends to web-based software applications the same legal guarantees of access that all physical public amenities must provide. The law now requires that new government web sites, and some existing web sites, make their content and functionality available to people with motor, visual or auditory disabilities.

Persons with auditory disabilities are typically able to use web sites. The toolbars and menus used to navigate web sites are navigable using a pointing device, sometimes referred to as a mouse, without the need for the user to hear auditory signals. Furthermore, special devices are available for those with motor disabilities that can be used to perform the functionality of a pointing device. However, enabling a user interface to be usable by the visually disabled presents special challenges, as pointing devices need visual interaction to operate.

One solution to enable a visually disabled person to use a web site is to use screen reader software to read the text of the web page. Screen reader software can detect textual messages presented by a user interface and read those messages to the user in a configurable voice. The visually disabled person can then hear audible text describing the web page and use a special device, such as a Braille keyboard, to enter the information needed to navigate the user interface.

However, most information used to navigate a web site does not appear as text on the web page. With the predominance of graphical user interfaces and the increasing sophistication of web-based user interfaces, text-based user interfaces are being replaced by user interfaces including icons, buttons, and other sophisticated sets of image-based controls such as toolbars. Screen readers cannot read, for example, tool tips or icon data.

What is needed is a graphical user interface that can be navigated by a person with visual disabilities.

SUMMARY OF THE INVENTION

The present invention relates to a method, system, user interface module, computer system, and computer program product that enable a graphical user interface to be used by persons with visual disabilities. The graphical user interface includes a toolbar, which provides features that enable a visually disabled user to navigate and activate the functions provided by buttons or other controls on the communication toolbar. As a user navigates around the user interface, auditory messages are read describing functionality of different features of the graphical user interface. The text can be audibly read by, for example, a screen reader module. By using a hotkey or menu navigation, a user can issue commands that would normally be issued by clicking on the toolbar. Furthermore, the user can type text into text input boxes, select items from combo boxes, enable broadcast messages to be read, and choose to listen to status messages.

In one feature, a method includes determining that a readable control of a user interface is activated and identifying a command associated with activation of the readable control. The identifying the command can include using a mapping between the readable control and a functional control. The method can further include issuing the command. In addition, the method can further include providing text for an audible message associated with the readable control. In one embodiment, the method further includes determining that a second readable control has obtained focus and providing text for an audible message associated with the second readable control.

In another feature, a method includes causing a state of a readable control of a user interface to change in response to obtaining an event. The method can further include providing text for an audible message in response to the change in the state.

In another feature of the invention, a interface module includes determining instructions to determine that a readable control of a user interface presented by the user interface module is activated and identifying instructions to identify a command associated with activation of the readable control.

In yet another feature, a user interface module includes causing instructions to cause a state of a readable control of a user interface presented by the user interface module to change in response to obtaining an event.

In another feature of the invention, a system includes determining means for determining that a readable control of a user interface is activated and identifying means for identifying a command associated with activation of the readable control.

In still another feature of the invention, a system includes causing means for causing a state of a readable control of a user interface to change in response to obtaining an event In another feature of the invention, a computer program product includes determining instructions to determine that a readable control of a user interface is activated, identifying instructions to identify a command associated with activation of the readable control, and a computer-readable medium to store the determining instructions and the identifying instructions.

In still another feature of the invention, a computer program product includes causing instructions to cause a state of a readable control of a user interface to change in response to obtaining an event and a computer-readable medium to store the causing instructions.

In another feature of the invention, a computer system includes a processor for executing computer instructions and a memory comprising the computer instructions. The computer instructions include determining instructions to determine that a readable control of a user interface is activated, and identifying instructions to identify a command associated with activation of the readable control.

In another feature of the invention, a computer system includes a processor for executing computer instructions and a memory comprising the computer instructions. The computer instructions include causing instructions to cause a state of a readable control of a user interface to change in response to obtaining an event.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
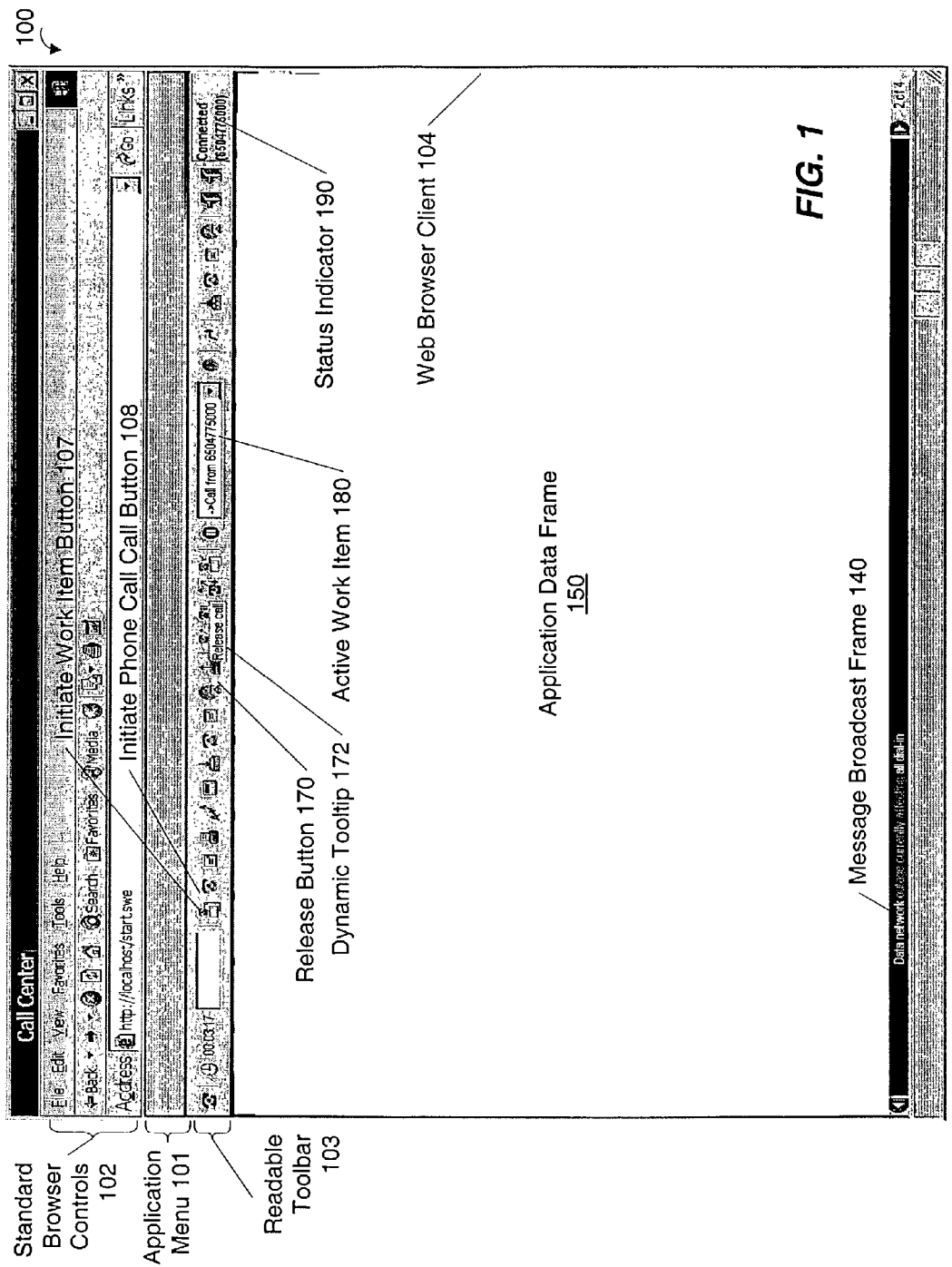
FIG. 1 provides an example of a user interface that operates according to the present invention.

The use of the same reference symbols in different drawings indicates similar or identical items. While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended claims.

DETAILED DESCRIPTION

For a thorough understanding of the subject invention, refer to the following Detailed Description, including the appended claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a method, system, user interface module, computer system, and computer program product that enable a graphical user interface to be used by persons with visual disabilities. The graphical user interface includes a toolbar, which provides features that enable a visually disabled user to navigate and activate the functions provided by buttons or other controls on the communication toolbar. As a user navigates around the user interface, auditory messages are read describing functionality of different features of the graphical user interface. The text can be audibly read by, for example, a screen reader module. By using a hotkey or menu navigation, a user can issue commands that would normally be issued by clicking on the toolbar. Furthermore, the user can type text into text input boxes, select items from combo boxes, enable broadcast messages to be read, and choose to listen to status messages.

FIG. 1 provides an example of a user interface that operates according to the present invention. User interface 100 is presented by a web browser client 104 and provides a multi-media communication user interface for a customer service agent, also referred to herein as a user. Using only a web browser to access the multi-media communication user interface, a user can communicate with customers via several types of media, including telephone, e-mail, facsimile, wireless messages, and pager messages One of ordinary skill in the art will recognize that the present invention is not limited to a customer service or communication application, or to a particular web-browser based user interface, but rather is extensible to any user interface.

In one embodiment, the user interface of FIG. 1 has the same appearance and functionality for all users, both those visually disabled and those with vision. However, different toolbars are visible and active, depending upon whether the user has vision. In one embodiment, a Java toolbar, also referred to herein as a functional toolbar, is presented for users with vision and has functions that are invoked when a Java toolbar button is activated. For visually disabled users, an HTML toolbar, also referred to as a readable toolbar, is presented.

HTML controls can, for example, provide text that can be read by a screen reader (not shown). However, the HTML language does not provide the robust functionality that full-featured controls supported by programming languages can, such as Java or Active X controls.

Referring to FIG. 1, web browser client 104 provides standard browser controls 102 and application menu 101. Readable toolbar 103 provides access to multi-media communication channels. For example, Initiate Work Item button 107 and Initiate Phone Call button 108 are examples of controls providing access to multi-media communication. Further explanation of the controls of readable toolbar 103 is provided with reference to FIG. 2.

Readable toolbar 103 can be, for example, a set of HTML controls. In user interface 100, a mapping is provided from each control of readable toolbar 103 to a corresponding control on a functional toolbar 105 (not shown) that is active for users with vision. This mapping to functional toolbar 105 enables user interface 100 to provide equivalent functionality when an HTML control is activated. The relationship between readable toolbar 103 and functional toolbar 105 is described in further detail with reference to FIGS. 3 and 4 below.

Application data frame 150 includes data provided by the customer service application. The user currently is accessing customer contact information. Customer Dashboard frame 160 provides additional information about the customer for which contact data is displayed in Application Data frame 150. Message Broadcast frame 140 enables all users of the customer service application to receive broadcast messages.

In the example provided in FIG. 1, the agent is currently participating in a telephone call with a caller having telephone number 1-650-477-5000, as indicated in the Active Work Item combo box 180. Status Indicator 190 indicates that the call is currently connected. The agent has currently placed focus on Release button 170, and dynamic tooltip 172 indicates that activating the button currently in focus, for example, by pressing the enter key, will release the currently active call. For a visually disabled user, the "Release Call" text of the dynamic tooltip is read by screen reader software to provide an audible message to the user.

The user interface of FIG. 1 is configured such that a visually disabled user can use a keyboard to navigate, rather than a pointing device, such as a mouse. For example, depressing the tab key moves the user from one frame to the next. For frames including a set of controls, such as a toolbar, the tab key moves the cursor from one control to the next. Depressing the tab key places the next control "in focus." When the focus changes from one control to another, a screen reader can read text associated with the control. For example, an audible message indicating the name of the control, such as "Release call," may be read when the user places Release button 170 in focus.

An audible message for a control also may include status information about the control in focus. For example, a control may be in one of several states, such as an enabled state, a disabled state, a blinking state, and a toggled state. An example of an enabled state is the Release button 170 when the user is currently connected on a telephone call. When the user is not connected on a telephone call or other active work item, Release button 170 is disabled. An example of a blinking state is when a button on the toolbar blinks to capture the user's attention. For a visually disabled user, an audible sound is played to capture the user's attention. An example of a toggled button is a login button. The login button is toggled "on" when a user is logged in, and the login button is toggled "off" when the user logs out.

When the enter key is pressed on a control in focus, the effect is similar to that of a mouse click, and a function associated with the control is activated. For example, pressing the enter key while focused on the Release button 170 releases the telephone call currently connected to extension 27416. The effect is the same as if the agent had hung up a telephone handset.

The user interface of the present invention also provides configurable hot keys. For example, rather than using a tab key to tab from one control to the next, a hot key can be defined as a shortcut to perform a particular function. For example, a ctrl-R key sequence may be defined to release a telephone call, rather than requiring the user to tab to the Release button 170 and press the enter key.

Similarly, the user interface of the present invention is configurable to read messages associated with dynamic tooltips, messages in the message broadcast frame 140, status information from status indicator 190, and so on. As an example, consider the example where the user has placed Release button 170 in focus. The user can trigger a hot key, such as the H key, to obtain help, which will audibly read dynamic tooltip 172.

Figure 2:
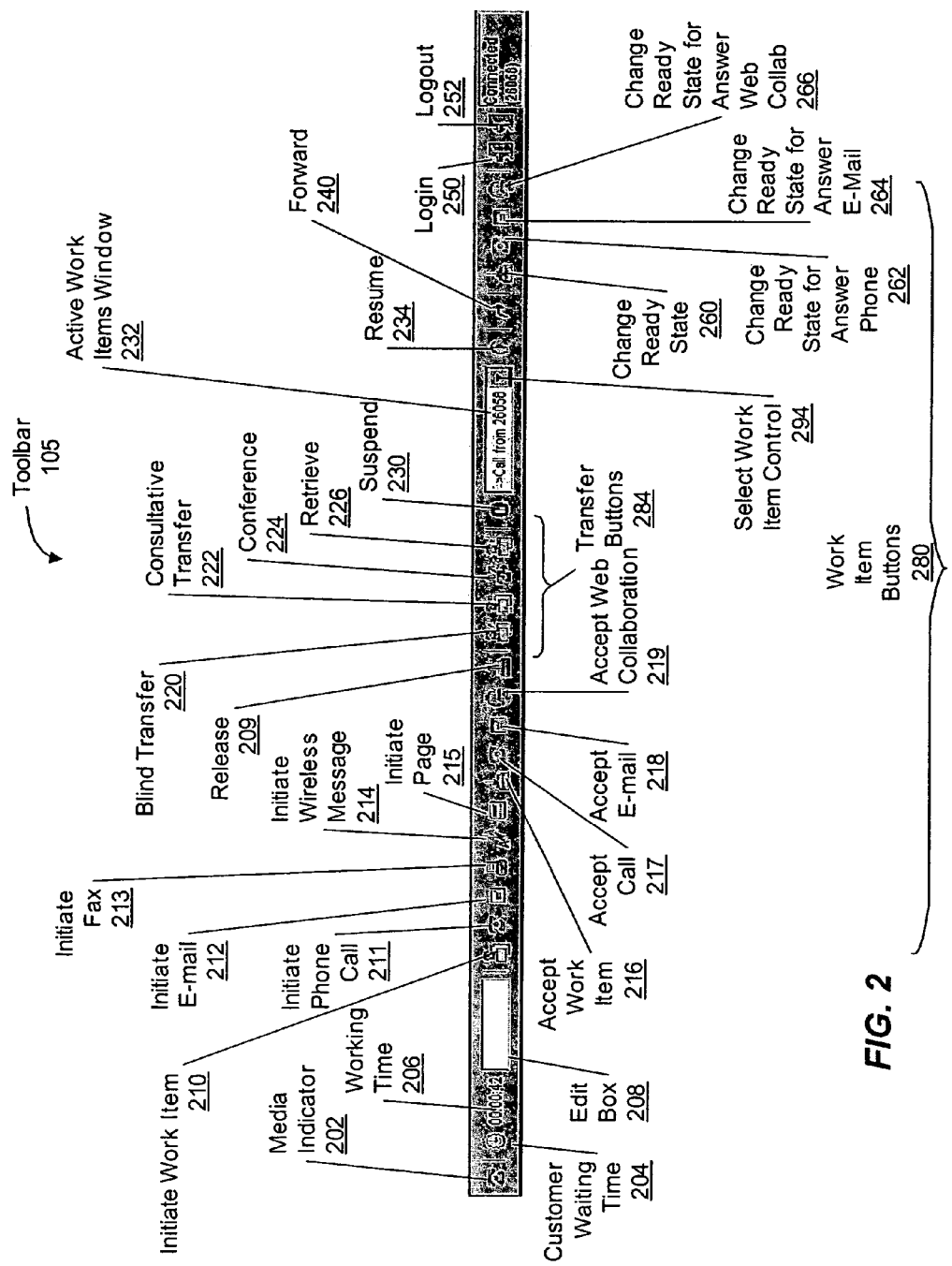
FIG. 2 shows the toolbar of the user interface of FIG. 1, including the individual controls on the toolbar.

FIG. 2 shows the toolbar of the user interface of FIG. 1, including the individual controls on the toolbar. Because readable toolbar 103 provides a single user interface for the agent to communicate using multiple communication channels of different media types, this embodiment of readable toolbar 103 includes a media indicator button 202 to show the media type of the currently active work item. Customer waiting time button 204 shows the amount of time that the customer has been waiting to receive a response to his or her customer support request associated with the work item. This information allows the agent to be responsive to the customer, for example, by apologizing when the customer has been waiting for a long time on hold on the telephone. Working time window 206 shows the amount of time the agent has spent working on the currently active work item. Edit box 208 allows the user to enter a small command, such as an extension number for dialing the telephone or a short message to be sent via short messaging service.

Work item buttons 280 include buttons for enabling the agent to manage all of his or her active work items for all media types and communication channels. Initiate work item button 210 enables the agent to initiate a work item of the current media type, as indicated by media indicator button 202. As shown in the example, the user may choose to use the telephone, email, fax, wireless messaging, or paging. The media types shown are determined by a communication server (not shown) by accessing a customer support center database (not shown) to obtain the customer support center configuration to which the agent belongs. The communication server then uses the customer support center configuration to eliminate the media types of the communication channels for which the agent cannot access.

The icon shown on Initiate Work Item button 210 includes symbols representing multiple media types of telephone, email, and paging. The icon is used to show that the initiate work item is an abstract icon representing a work item for any media type. If the agent clicks on the initiate button 210 when displaying the abstract icon, readable toolbar 103 will determine from the context of the toolbar what the agent is trying to do. For instance, if the user is currently on the telephone with a customer, media indicator button 202 will show a telephone. If the agent simultaneously is viewing an email address for a contact and the user clicks on the initiate work item button, readable toolbar 103 will determine that, because the agent is already on the telephone and the contact has an email address, the agent must be trying to send an email to the contact. Readable toolbar 103 can be configured so that the new email screen is loaded with the customer information in order to save the agent time in typing the email. Readable toolbar 103 is configurable by an administrator using a configuration user interface.

Initiate Phone Call button 211 enables the user to initiate a telephone call and will prompt the user for the telephone number or dial the telephone number entered by the user in edit box 208. Initiate e-mail button 212 enables the user to write an e-mail, initiate fax button 213 enables the user to prepare a fax message, and initiate wireless message button 214 enables the user to send a message to a wireless device, such as a cellular telephone. Initiate page button enables the user to send a message to a pager.

Accept work item button 216 allows the user to accept an incoming work item. Notification of an incoming work item is provided by readable toolbar 103 using a notification function. For example, the notification function can cause an audible sound or voice message to be provided when the agent has an incoming work item. When the agent accepts a work item, a command is sent by web browser client 104 to a communication server, which responds to the command by issuing the command to a communication channel.

Accept work item button 216 enables the agent to select from a list of incoming work items. Accept phone button 217 enables the agent to accept an incoming telephone call, accept e-mail button 218 enables the agent to accept an incoming e-mail, and accept web collaboration button 219 enables the agent to accept a request for a web collaboration with a customer.

Release button 209 is used to release an active work item. In one embodiment, a communication server can be configured to release the telephone call work item automatically when the agent hangs up the telephone handset without clicking the release button 209. The hardware controlling the telephone connection sends a disconnect signal to the telephone switch to disconnect the agent's and customer's telephone lines.

Transfer buttons 284 are related to transferring work items such as telephone calls. Blind transfer button 220 enables the agent to transfer a telephone call to another extension and hang up without confirming whether an agent at the extension accepted the telephone call. If the telephone call is not accepted by another agent, the customer service application can be configured to place the telephone call as a work item into a queue of work items for transferring to another agent. The telephone call is removed from the transferring agent's list of active work items.

Consultative transfer button 222 enables an agent to consult with an agent at another extension before the call is transferred and to keep the telephone call if the other agent does not answer. Conference button 224 enables the agent to connect more than two telephone lines together for a joint telephone conversation. Retrieve button 226 enables the agent to retrieve a telephone call that the agent has transferred.

Suspend button 230 enables an agent to suspend a work item; for example, the agent can put a telephone call on hold or suspend writing an email response to work on another work item or take a break. Active work items window 232 enables the agent to see the currently active work item. Select work item control 294 enables the agent to select a work item from the list of work items currently assigned to the agent. Resume button 234 allows the agent to resume work on a work item selected from the list of work items.

Forward button 240 applies to media types such as telephones and email. All telephone calls to a particular telephone number can be automatically forwarded to another telephone number when, for example, an agent is away from his usual work location. In the context of media types such as email, forward button command 240 can be configured to operate as a forward command, retaining a copy of the original email or as "transfer" of the email removing the email from the agent's inbox and from the agent's list of active work items.

Because the customer service application is designed to monitor and provide real time information to agents, the agent needs a means of communicating his or her availability to accept work items from the customer service application. Change ready state button enables the user to update his status from "ready" to receive incoming work items to "not ready." Change Ready State button 260 is an example of a button that can be toggled from one state to another. Buttons 262, 264, and 266 enable the user to change state for a single medium. For example, Change Ready State of Answer Phone button 262 allows a user to indicate that he is not ready to accept telephone calls; Change Ready State of Answer E-mail button 264 allows a user to indicate that he is not ready to receive e-mail work items; and Change Ready State of Answer Web Collaboration button 266 enables a user to indicate that he is not ready to answer a request for a web collaboration.

Login button 250 allows the agent to login to the customer service application to work on work items. Logout button 252 allows the agent to logout from the customer service application.

Because the operation of each button of readable toolbar 103 is configurable by associating a control with a command, readable toolbar 103 provides maximum flexibility in providing its customer support center with a tool for communicating via multiple communication channels of different media types.

Figure 3:
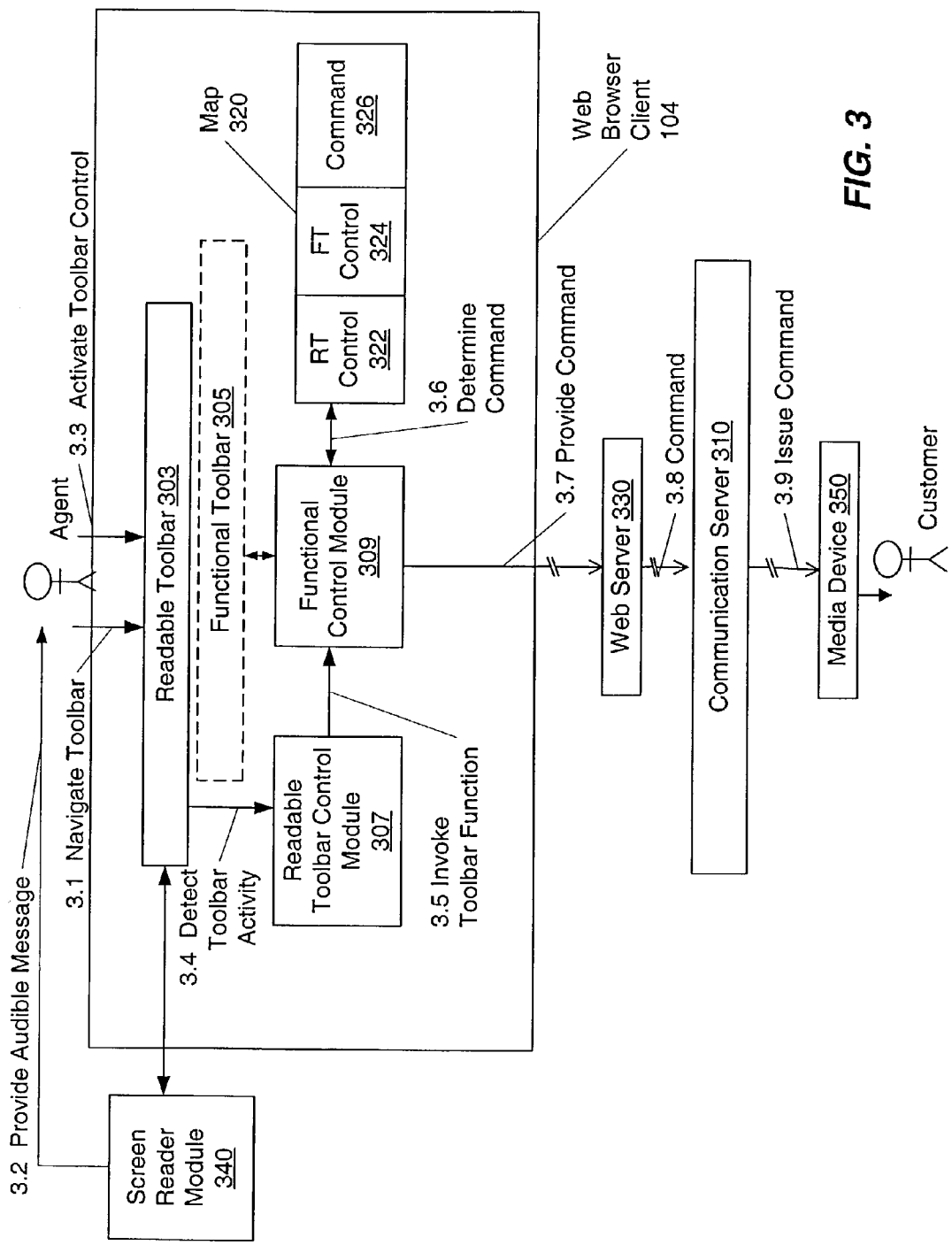
FIG. 3 shows an example of the operation of the user interface of FIG. 2 in issuing a command, such as making an outgoing telephone call.

FIG. 3 shows an example of the operation of the toolbar of FIG. 2 in issuing a command, such as making an outgoing telephone call. In action 3.1, the agent navigates readable toolbar 303. As the agent navigates the toolbar, in action 3.2, screen reader module 340 provides audible messages to the agent indicating each control in focus. When the user activates a control of readable toolbar 303 in action 3.3, readable toolbar control module 307 detects the toolbar activity in action 3.4.

Readable toolbar control module 307 may be implemented, for example, as a Java script. Readable toolbar control module 307 invokes a toolbar function of functional control module 309 in action 3.5. Functional control module 309 controls functional toolbar 305 (not visible, as indicated by the dotted line) in the customer service application for users with vision. Functional control module 309 may be implemented, for example, as a Java applet. An example of the interface function of functional control module 309 is given below:

Public String InvokeToolbarFunction (String FunctionName, String Control_ID, String parameter)

This function triggers a function associated with a functional toolbar 305 control. Example invocations of the InvokeToolbarFunction function are provided below:

Tooltip=InvokeToolbarFunction ("GetDynamicTooltip", "Initiate Phone", null)

Nothing=InvokeToolbarFunction ("InvokeCommand", "Initiate Phone", 26058)

Functional control module 309 uses the parameters provided by readable toolbar control module 307 and, in action 3.7, determines a command to issue in response to activation of the control activated in action 3.3.

As mentioned above, a mapping is provided from each control of readable toolbar 303 to a corresponding control on functional toolbar 305. This mapping to functional toolbar 305 enables user interface 100 to provide equivalent functionality when an HTML control is activated.

For example, a button on functional toolbar 305 may be mapped to a hyperlink with an image. The name of the button can be mapped to the first part of the text name of the hyperlink, and the state of the button can be mapped to the second part of the text name of the hyperlink. For example, a hyperlink may have a name such as "Make Call. Enabled."

The behavior of a button can also be defined. For example, the equivalent of a mouseover event occurs when a visually disabled user tabs to a control and invokes a hot key, such as H, for help. In response to activating the hot key, the GetDynamicTooltip function of functional toolbar 305 can be called by invoking the following function:

InvokeToolbarFunction ("GetDynamicTooltip", Control_ID, null).

As a result of this function call, the dynamic tooltip will be updated and presented as text on the readable HTML toolbar in a manner similar to a mouseover event. When a user places focus on that control, screen reader software 340 detects the change and provides an audible message reading the text of the dynamic tooltip.

An edit box of the functional toolbar can be mapped to an edit box of an HTML form control. The text of the edit box can be mapped to the text of the HTML edit box. As the user types in the text, screen reader software can read the information typed as an audible message.

The user can then tab to a button to invoke a command, and the text in the edit box can serve as a parameter for the command. For example, if the user types a telephone extension number in the edit box 208, the user can tab to Initiate Phone Call button 211 to issue a command to make a telephone call to the telephone number entered in edit box 208.

A combo box of the functional toolbar can be mapped to the combo box of HTML form control. The item list of the combo box is mapped to the item list of an HTML combo box. When an item is selected from the combo box, an ItemChanged event calling the InvokeCommand function can be mapped to an ItemChanged event calling the following function:

InvokeToolbarFunction ("InvokeCommand", Control_ID, selectedItem).

A timer on the functional toolbar can be mapped to a hyperlink. The text of the timer is updated by Functional Control module 309, and in response, screen reader software 340 automatically reads the updated time to provide an audible message.

These mappings from readable toolbar 303 controls to functional toolbar 305 controls may be included, for example, in a data table such as map 320. Map 320 includes a data field indicating the readable toolbar (RT) control 322, a data field indicating the functional toolbar (FT) control 324, and the command 326 associated with the functional toolbar control. One of skill in the art will recognize that the information presented as part of map 320 is a conceptual representation of the types of data that may be referenced. The information may be stored as data fields in memory, in one or more database tables, in one or more files, or in one or more other types of data storage. Furthermore, the information stored can be structured in various alternative ways to associate a command with the readable toolbar (HTML) control.

In action 3.7, functional control module 309 provides the command to web server 330, which passes the command in action 3.8 to communication server 310. The break in the arrow from functional control module 309 to web server 330 for action 3.7 indicates that intermediate software modules and/or hardware devices may be involved in providing the command from functional control module 309 to web server 330. In action 3.9, communication server 310 issues the command via a communication channel to communicate with a media device 350 accessible by the customer. Depending upon the media of the communication, the command may pass through another web server, a middleware server such as an e-mail server, a switching device, or other communication module before reaching the customer's media device 350.

The operation of communication server 310, toolbar 305, and other components of the customer service application described herein are further described in U.S. patent application Ser. No. 09/823,531, filed on Mar. 31, 2001, entitled "User Interface for Multi-Channel Communication" and naming Mingte Chen, Anil K. Annadata, and Kuang Huang as inventors, the application being incorporated herein by reference in its entirety.

Figure 4:
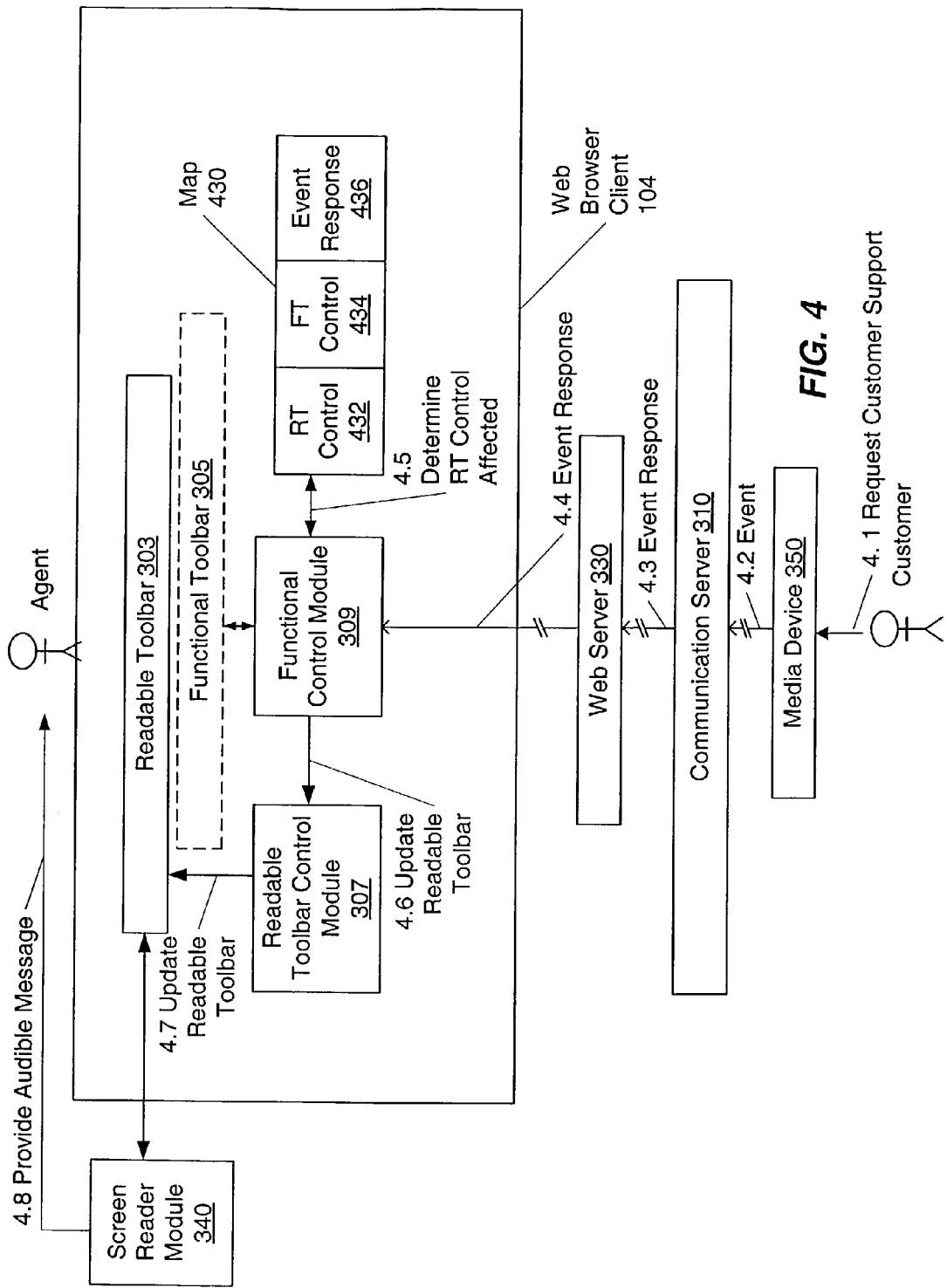
FIG. 4 shows another example of the operation of the user interface of FIG. 2 in receiving an event, such as receiving an incoming customer telephone call.

FIG. 4 shows another example of the operation of the toolbar of FIG. 2 in receiving an event, such as receiving an incoming customer telephone call. In action 4.1, a customer initiates a customer support request, which corresponds to an event. For example, the customer may place a telephone call or send an e-mail, fax or page to the customer support center.

In action 4.2, the event passes from the customer's media device 350 to communication server 310. As noted earlier, the event may pass through intermediate software modules or hardware devices between the customer's media device 350 and communication server 310.

Communication server 310 provides an event response in action 4.3 to web server 330, which in turn provides the event response in action 4.4 to functional control module 309. In action 4.5, functional control module 309 determines the appropriate readable toolbar control to be changed as part of the event response by accessing data stored, for example, as data table map 430. Map 430 includes the mapping between RT control 432, FT control 434, and an event response 436. Again, one of skill in the art will recognize that the information presented as part of map 430 is a conceptual representation only, that the information may be stored as data in one or more other types of temporary or persistent data storage, and that the information may be structured differently.

Upon determining the identity of the readable toolbar control to be changed, in action 4.6, functional control module 309 calls an update readable toolbar function of readable toolbar control module 307. An example interface function is given below:

Function UpdateHTMLControl (Control_ID, argument(s))

This function updates the readable HTML toolbar using arguments, such as the Control_ID of the readable toolbar control and the state of the HTML control. An example invocation of the UpdateHTMLControl function is given below:

UpdateHTMLControl ("Accept Call", "state: Blinking")

As noted above, the Control_ID, which corresponds to the name of the control, and the state of the control are combined to provide a name of the hyperlink associated with an image icon. In this example, the name of the hyperlink is "Accept Call. Blinking."

Readable toolbar control module 307 uses provides this hyperlink name to the readable toolbar in action 4.7 to update the name of the corresponding HTML control. Assigning new values for the name of the control and its status are changes in the readable toolbar control, and these changes are automatically detected by screen reader module 340. The response to this function call is to read an audible message containing the name of the hyperlink, "Accept Call. Blinking," in action 4.8, which indicates an incoming telephone call.

System Suitable for Implementing the Present Invention

Figure 5:
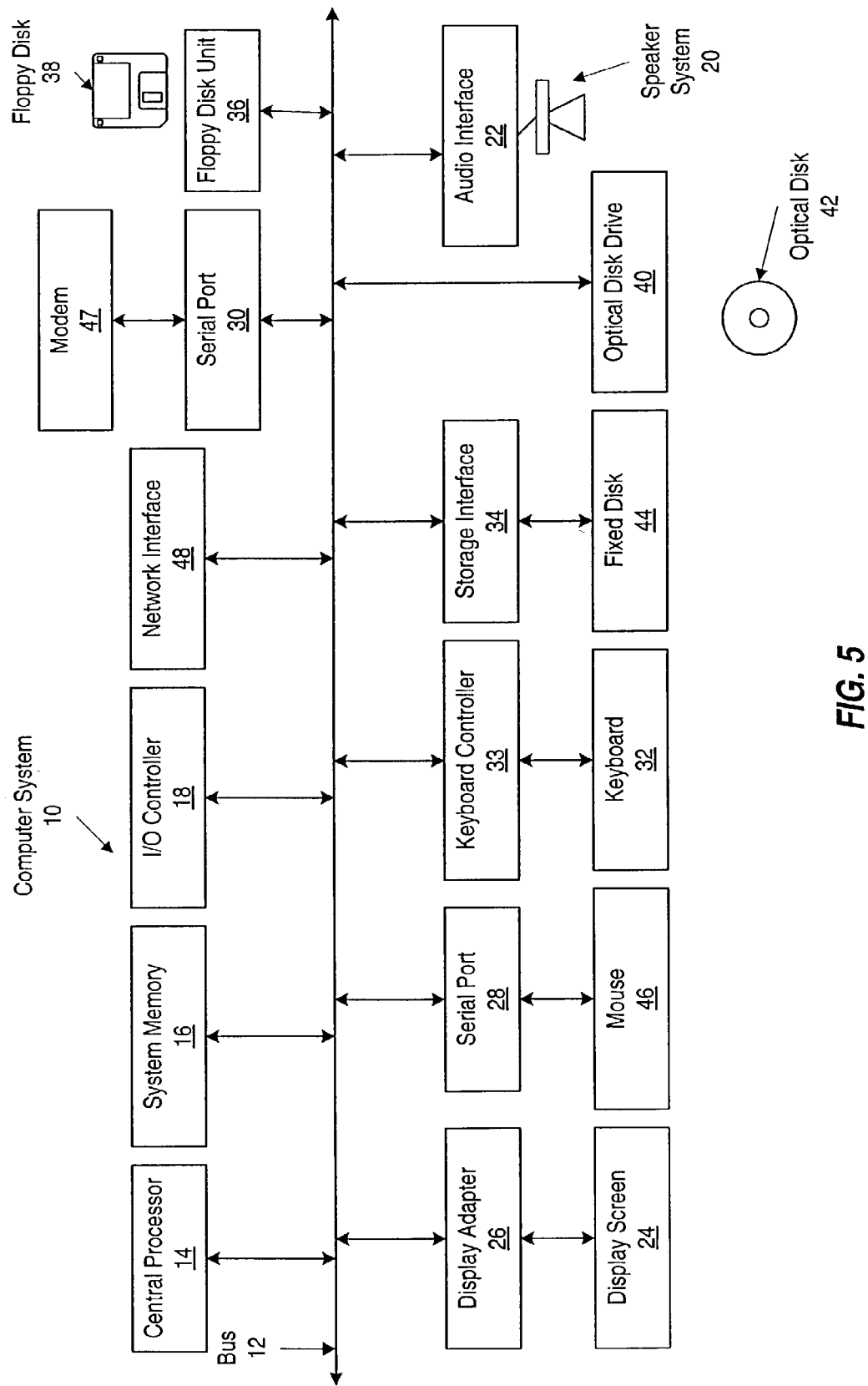
FIG. 5 is a block diagram illustrating a computer system suitable for implementing embodiments of the present invention.

FIG. 5 depicts a block diagram of a computer system 10 suitable for implementing the present invention. Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 may be any kind of computing device, and so includes personal data assistants (PDAs), network appliances, X-window terminals or other such computing devices. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator 3.0, Microsoft Explorer® 3.0 and the like.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
presenting a user interface, wherein
 the user interface comprises a set of toolbars, wherein
  the set of toolbars comprises
   a functional toolbar, and
   a readable toolbar,
  the readable toolbar is associated with an image-based toolbar,
  the functional toolbar comprises a functional control
  the readable toolbar comprises an audible control,
 the user interface further comprises a mapping between the audible control and the functional control, and
 the user interface is configured to support communication via a plurality of communication channels;
providing an audible indication of the audible control, if the audible control is in focus;
detecting an activation of the audible control by virtue of being configured to determine that the audible control is in focus, and determine that a designated key of a keyboard has been pressed;
identifying a command associated with the activation of the audible control, wherein
 the interface is configured to identify the command using the mapping,
 the functional control is associated with a function, and
 the audible control is a non-functional control by virtue of being incapable of issuing the command; and
in response to the activation of the audible control, causing the functional control to issue the command, wherein
 the issuance of the command causes the function to be performed,
 the performance of the function results in communication via a communication channel of the plurality of communication channels, and
 a media type of each of the plurality of communication channels is one of a plurality of media types.

2. The method of claim 1 further comprising:
determining that a second audible control has obtained focus; and
providing text for an audible message associated with the second audible control.

3. The method of claim 2 further comprising:
providing a user an ability to navigate user interface using a keyboard;
providing text for a second audible message in response to receiving a hot key activation, wherein
 the hot key is configured to associate a plurality of keys on the keyboard with the second audible control.

4. The method of claim 3 further comprising:
accepting a user selection using a keyboard and a cursor.

5. The method of claim 4 wherein the user interface comprises a plurality of frames and the user can navigate from one frame to the next frame by depressing a tab key.

6. The method of claim 5, wherein each of the plurality of frames further comprises a plurality of controls and the user can navigate from one control to the next control by depressing the tab key.

7. The method of claim 6 wherein the depressing the tab key places a next control in focus and a screen reader reads text associated with the next control.

8. The method of claim 2 wherein said audible message further comprises a status of the second audible control which has obtained focus wherein the status comprises at least one of an enabled state, a disabled state, a blinking state, and a toggled state.

9. The method of claim 8 wherein when an element on the user interface blinks, a state of the element is changed to the blinking state and an audible sound is played to capture the user's attention.

10. The method of claim 1 further comprising:
providing text for an audible message associated with the audible control.

11. The method of claim 1 further comprising:
providing text for an audible message in response to a change of state of the audible control.

12. The method of claim 1 wherein the audible control is activated using a hot key.

13. The method of claim 1 further comprising:
causing a state of the audible control to change in response to obtaining an event.

14. The method of claim 1, further comprising in response to whether a user is visually impaired or not, presenting the user interface by changing the set of toolbars to account for the user being visually impaired.

15. The method of claim 1, further comprising:
mapping a second audible control of a plurality of audible controls to a second functional control of a plurality of functional controls, wherein
 the functional toolbar comprises the plurality of functional controls,
 the functional controls comprise the functional control,
 the readable toolbar comprises the plurality of functional controls, and
 the plurality of audible controls comprise the audible control.

16. The method of claim 1, wherein
the communication is with a media-specific device coupled to the communication channel, and
the media-specific device and the communication channel have the same media type.

17. A method comprising:
presenting a user interface, wherein
 the user interface comprises a set of toolbars, wherein
  the set of toolbars comprises
   a functional toolbar, and
   a readable toolbar,
  the readable toolbar is associated with an image-based toolbar,
  the functional toolbar comprises a functional control,
  the readable toolbar comprises an audible control, the user interface further comprises a mapping between the audible control and the functional control, and
the user interface is configured to support communication via a plurality of communication channels;
receiving an incoming communication event;
identifying a second functional control of the functional toolbar based on the incoming communication event, wherein the second functional control is identified using the mapping; and
causing a state of the audible control of the user interface to change in response to the identifying of the second functional control.

18. The method of claim 17 further comprising:
providing text for an audible message in response to the change in the state.

19. A user interface module comprising:
a plurality of instructions, wherein the plurality of instructions comprise:
presenting instructions to present a user interface, wherein
the user interface comprises a set of toolbars, wherein
the set of toolbars comprises
a functional toolbar, and
a readable toolbar,
the readable toolbar is associated with an image-based toolbar,
the functional toolbar comprises a functional control,
the readable toolbar comprises an audible control,
the user interface further comprises a mapping between the audible control and the functional control, and
the user interface is configured to support communication via a plurality of communication channels;
providing instructions to provide an audible indication of the audible control, if the audible control is in focus;
detecting instructions to detect an activation of the audible control by virtue of being configured to determine that the audible control is in focus, and determine that a designated key of a keyboard has been pressed;
identifying instructions to identify a command associated with the activation of the audible control, wherein
the identifying instructions are configured to use the mapping to identify the command,
the functional control is associated with a function, and
the audible control is a non-functional control by virtue of being incapable of issuing the command; and
issuing instructions to, in response to the activation of the audible control, cause the functional control to issue the command, wherein the issuance of the command causes the function to be performed,
the performance of the function results in communication via a communication channel of the plurality of communication channels, and
a media type of each of the plurality of communication channels is one of a plurality of media types; and
a computer readable storage medium to store the plurality of instructions.

20. The user interface module of claim 19 further comprising:
determining instructions to determine that a second audible control of the user interface has obtained focus; and
providing instructions to provide text for an audible message associated with the second audible control.

21. The user interface module of claim 19 further comprising:
providing instructions to provide text for an audible message associated with the audible control.

22. A user interface module comprising:
a plurality of instruction, wherein the plurality of instructions comprise:
presenting instructions to present a user interface, wherein the user interface comprises a set of toolbars, wherein
the set of toolbars comprises
a functional toolbar, and
a readable toolbar,
the readable toolbar is associated with an image-based toolbar,
the functional toolbar comprises a functional control,
the readable toolbar comprises an audible control,
the user interface further comprises a mapping between the audible control and the functional control, and
the user interface is configured to support communication via a plurality of communication channels;
receiving instructions to receive an incoming communication event;
identifying instruction to identify a second functional control of the functional toolbar based on the incoming communication event, wherein the second functional control is identified using the mapping; and causing instructions to cause a state of the audible control of the user interface presented by the user interface module to change in response to the identifying of the second functional control; and a computer readable storage medium to store the plurality of instructions.

23. The user interface module of claim 22 further comprising:
providing instructions to provide text for an audible message in response to the change in the state.

24. A system comprising:
a processor; a display coupled to the processor; a computer readable storage medium coupled to the processor;
means for presenting a user interface displayed on the display, wherein
the user interface comprises a set of toolbars, wherein
the set of toolbars comprises
a functional toolbar, and
a readable toolbar,
the readable toolbar is associated with an image-based toolbar,
the functional toolbar comprises a functional control,
the readable toolbar comprises an audible control,
the user interface further comprises a mapping between the audible control and the functional control, and
the user interface is configured to support communication via a plurality of communication channels;
means for providing an audible indication of the audible control, if the audible control is in focus;
means for detecting an activation of the audible control by virtue of being configured to determine that the audible control is in focus, and determine that a designated key of a keyboard has been pressed;
means for identifying a command associated with the activation of the audible control, wherein
the identifying means comprise using means for using the mapping to identify the command,
the functional control is associated with a function, and
the audible control is a non-functional control by virtue of being incapable of issuing the command; and
means for, in response to the activation of the audible control, causing the functional control to issue the command, wherein the issuance of the command causes the function to be performed, the performance of the function results in communication via a communication channel of the plurality of communication channels, and a media type of each of the plurality of communication channels is one of a plurality of media types.

25. The system of claim 24 further comprising:
means for determining that a second readable control has obtained focus; and
means for providing text for an audible message associated with the second readable control.

26. The system of claim 24 further comprising:
means for providing text for an audible message associated with the readable control.

27. A system comprising:
means for identifying a second functional control of the functional toolbar based on the incoming communication event, wherein the second functional control is identified using the mapping; and
means for causing a state of the audible control of the user interface to change in response to the identifying of the second functional control,
means for presenting a user interface displayed on the display
the user interface comprises a set of toolbars, wherein
the set of toolbars comprises
a functional toolbar, and
a readable toolbar,
the readable toolbar is associated with an image-based toolbar,
the functional toolbar comprises a functional control,
the readable toolbar comprises an audible control,
the user interface further comprises a mapping between the audible control and the functional control, and
the user interface is configured to support communication via a plurality of communication channels;
means for receiving an incoming communication event;
means for identifying a second functional control of the functional toolbar based on the incoming communication event, wherein the second functional control is identified using the mapping; and
means for causing a state of the audible control of the user interface to change in response to the identifying of the second functional control.

28. The system of claim 27 further comprising:
means for providing text for an audible message in response to the change in the state.

29. A computer program product comprising:
presenting instructions to present a user interface, wherein
the user interface comprises a set of toolbars, wherein
the set of toolbars comprises
a functional toolbar, and
a readable toolbar,
the readable toolbar is associated with an image-based toolbar,
the functional toolbar comprises a functional control,
the readable toolbar comprises an audible control,
the user interface further comprises a mapping between the audible control and the functional control, and
the user interface is configured to support communication via a plurality of communication channels;
providing instructions to provide an audible indication of the audible control, if the audible control is in focus;
detecting instructions to determine that an detect an activation of the audible control by virtue of being configured to determine that the audible control is in focus, and determine that a designated key of a keyboard has been pressed;
identifying instructions to identify a command associated with activation of the audible control, wherein
the identifying instructions comprise using instructions to use the mapping to identify the command,
the functional control is associated with a function, and
the audible control is a non-functional control by virtue of being incapable of issuing the command; and
issuing instructions to cause the functional control to, in response to the activation of the audible control, cause the functional control to issue the command, wherein
the issuance of the command causes the function to be performed,
the performance of the function results in communication via a communication channel of the plurality of communication channels, and
a media type of each of the plurality of communication channels is one of a plurality of media types; and
a computer-readable storage medium to store the instructions.

30. The computer program product of claim 29 further comprising:
second detecting instructions to detect that a second audible control has obtained focus; and
second providing instructions to provide text for an audible message associated with the second audible control; wherein
the computer-readable storage medium further stores the second detecting instructions and the second providing instructions.

31. The computer program product of claim 29 further comprising:
second providing instructions to provide text for an audible message associated with the audible control; wherein
the computer-readable storage medium further stores the second providing instructions.

32. A computer program product comprising:
presenting instruction to present a user interface, wherein
the user interface comprises a set of toolbars, wherein
the set of toolbars comprises
a functional toolbar, and
a readable toolbar,
the readable toolbar is associated with an image-based toolbar,
the functional toolbar comprises a functional control,
the readable toolbar comprises an audible control,
the user interface further comprises a mapping between the audible control and the functional control, and
the user interface is configured to support communication via a plurality of communication channels;
receiving instructions to receive an incoming communication event
identifying instruction to identify a second functional control of the functional toolbar based on the incoming communication event, wherein the second functional control is identified using the mapping; and causing instructions to cause a state of the audible control of the user interface presented by the user interface module to change in response to the identifying of the second functional control; and
a computer-readable storage medium to store the causing instructions and the identifying instructions.

33. The computer program product of claim 32 further comprising:
providing instructions to provide text for an audible message in response to the change in the state; wherein
the computer-readable storage medium further stores the second providing instructions.

34. A computer system comprising:
a processor for executing computer instructions; and
a memory storing the computer instructions, wherein the computer instructions comprise:
   presenting instructions to present a user interface, wherein the user interface comprises a set of toolbars, wherein
      the set of toolbars comprises
         a functional toolbar, and
         a readable toolbar,
      the readable toolbar is associated with an image-based toolbar,
      the functional toolbar comprises a functional control,
      the readable toolbar comprises an audible control,
      the user interface further comprises a mapping between the audible control and the functional control, and
      the user interface is configured to support communication via a plurality of communication channels;
   providing instructions to provide an audible indication of the audible control, if the audible control is in focus;
   detecting instructions to detect activation of the audible control by virtue of being configured to
      determine that the audible control is in focus, and
      determine that a designated key of a keyboard has been pressed;
   identifying instructions to identify a command associated with the activation of the audible control, wherein
   the identifying instructions comprise using instructions to use the mapping to identify the command, the functional control is associated with a function, and the audible control is a non-functional control by virtue of being incapable of issuing the command; and
      issuing instructions to, in response to the activation of the audible control, cause the functional control to issue the command, wherein the issuance of the command causes the function to be performed,
         the performance of the function results in communication via a communication channel of the plurality of communication channels, and
         a media type of each of the plurality of communication channels is one of a plurality of media types.

35. The computer system of claim 34 wherein the computer instructions further comprise:
   second detecting instructions to determine that a second audible control has obtained focus; and
   second providing instructions to provide text for an audible message associated with the second audible control.

36. The computer system of claim 34 wherein the computer instructions further comprise:
   second providing instructions to provide text for an audible message associated with the audible control.

37. A computer system comprising:
a processor for executing computer instructions;
a memory storing the computer instructions, wherein the computer instructions comprise:
   presenting instructions to present a user interface, wherein the user interface comprises a set of toolbars, wherein
      the set of toolbars comprises
         a functional toolbar, and
         a readable toolbar,
      the readable toolbar is associated with an image-based toolbar,
      the functional toolbar comprises a functional control,
      the readable toolbar comprises an audible control,
      the user interface further comprises a mapping between the audible control and the functional control, and
      the user interface is configured to support communication via a plurality of communication channels;
   receiving instructions to receive an incoming communication event
   identifying instruction to identifying a second functional control of the functional toolbar based on the incoming communication event, wherein the second functional control is identified using the mapping; and causing instructions to cause a state of the audible control of the user interface to change in response to the identifying of the second functional control.

38. The computer system of claim 37 wherein the computer instructions further comprise:
   providing instructions to provide text for an audible message in response to the change in the state.

* * * * *

UNITED STATES PATENT AND TRADEMARK OFFICE
CERTIFICATE OF CORRECTION

PATENT NO. : 7,673,241 B2
APPLICATION NO. : 10/180674
DATED : March 2, 2010
INVENTOR(S) : Zhaoyang Sun et al.

It is certified that error appears in the above-identified patent and that said Letters Patent is hereby corrected as shown below:

On the Title Pg, Item (74), Attorney, line 1, delete "Cambell" and insert -- Campbell --, therefor.

In column 1, line 9, delete "531" and insert -- 531, --, therefor.

In column 2, line 25, delete "a" and insert -- an --, therefor.

In column 11, line 52, delete "Navigator" and insert -- Navigator® --, therefor.

In column 13, line 31, in Claim 1, delete "control" and insert -- control, --, therefor.

In column 13, line 45, in Claim 1, before "interface" insert -- user --.

In column 13, line 66, in Claim 3, after "navigate" insert -- the --.

In column 14, line 37, in Claim 14, delete "comprising" and insert -- comprising: --, therefor.

In column 14, line 47, in Claim 15, delete "the functional controls" and insert -- the plurality of functional controls --, therefor.

In column 14, line 48-49, in Claim 15, delete "functional" and insert -- audible --, therefor.

In column 16, line 2, in Claim 22, delete "instruction," and insert -- instructions, --, therefor.

In column 16, line 20, in Claim 22, delete "instruction" and insert -- instructions --, therefor.

In column 17, lines 15-23, in Claim 27, delete "means for identifying a second functional control of the functional toolbar based on the incoming communication event, wherein the second functional control is identified using the mapping; and means for causing a state of the audible control of the user interface to change in response to the identifying of the second functional control, means for presenting a user interface displayed on the display" and insert -- a processor; a display coupled to the processor; a computer readable storage medium coupled to the processor; means for presenting a user interface displayed on the display, wherein --, therefor.

Signed and Sealed this

Fifth Day of October, 2010

David J. Kappos
*Director of the United States Patent and Trademark Office*

CERTIFICATE OF CORRECTION (continued)
U.S. Pat. No. 7,673,241 B2

In column 17, line 57, in Claim 29, delete "mapping" and insert -- mapping to identifying the command --, therefor.

In column 17, line 63, in Claim 29, after "to" delete "determine that an".

In column 18, line 37, in Claim 32, delete "instruction" and insert -- instructions --, therefor.

In column 18, line 51, in Claim 32, after "event" insert -- ; --.

In column 18, line 52, in Claim 32, delete "instruction" and insert -- instructions --, therefor.

In column 18, line 55, in Claim 32, before "causing" delete "and".

In column 20, line 2, in Claim 35, delete "comprise:" and insert -- comprises: --, therefor.

In column 20, line 30, in Claim 37, after "event" insert -- ; --.

In column 20, line 31 in Claim 37, delete "instruction" and insert -- instructions --, therefor.